(12) United States Patent
Ding et al.

(10) Patent No.: US 11,789,455 B2
(45) Date of Patent: Oct. 17, 2023

(54) CONTROL OF AUTONOMOUS VEHICLE BASED ON FUSION OF POSE INFORMATION AND VISUAL DATA

(71) Applicant: Apollo Intelligent Driving Technology (Beijing) Co., Ltd., Beijing (CN)

(72) Inventors: Wendong Ding, Beijing (CN); Xiaofei Rui, Bejing (CN); Gang Wang, Bejing (CN); Shiyu Song, Sunnyvale, CA (US)

(73) Assignees: Beijing Baidu Netcom Science Technology Co., Ltd., Beijing (CN); Apollo Intelligent Driving Technology (Beijing) Co., Ltd., Beijing (CN)

( * ) Notice: Subject to any disclaimer, the term of this patent is extended or adjusted under 35 U.S.C. 154(b) by 264 days.

(21) Appl. No.: 17/137,048

(22) Filed: Dec. 29, 2020

(65) Prior Publication Data

US 2021/0370970 A1 Dec. 2, 2021

(30) Foreign Application Priority Data

Jun. 2, 2020 (CN) .......................... 202010497244.0

(51) Int. Cl.
*G05D 1/02* (2020.01)
*B60W 60/00* (2020.01)
(Continued)

(52) U.S. Cl.
CPC .......... *G05D 1/0246* (2013.01); *B60W 60/001* (2020.02); *G06F 18/25* (2023.01);
(Continued)

(58) Field of Classification Search
CPC .............. G05D 1/0246; B60W 60/001; B60W 2420/403; B60W 2422/70; B60W 2520/28; G06V 20/56; G06F 18/25
(Continued)

(56) References Cited

U.S. PATENT DOCUMENTS 9,612,123 B1 * 4/2017 Levinson ............... B60Q 5/006
9,915,947 B1 * 3/2018 LaForge ............... G05D 1/0077
(Continued)

FOREIGN PATENT DOCUMENTS

CN 107747941 A 3/2018
CN 108196285 A 6/2018
(Continued)

OTHER PUBLICATIONS

Office Action from corresponding Japanese Application No. 2021-064297 dated Jun. 9, 2022. (8 pages).
(Continued)

*Primary Examiner* — Richard A Goldman
(74) *Attorney, Agent, or Firm* — Harness, Dickey & Pierce, P.L.C.

(57) ABSTRACT

Embodiments of the present application disclose a positioning method and apparatus, an autonomous driving vehicle, an electronic device and a storage medium, relating to the field of autonomous driving technologies, comprising: collecting first pose information measured by an inertial measurement unit within a preset time period, and collecting second pose information measured by a wheel tachometer within the time period; generating positioning information according to the first pose information, the second pose information and the adjacent frame images; controlling driving of the autonomous driving vehicle according to the positioning information. The positioning information is estimated by combining the first pose information and the second pose information corresponding to the inertial measurement unit and the wheel tachometer respectively. Compared with the camera, the inertial measurement unit and the wheel tachometer are not prone to be interfered by the external environment.

10 Claims, 6 Drawing Sheets

Obtaining a coordinate transformation parameter of the wheel tachometer relative to the inertial measurement unit — S21

Performing a coordinate transformation on the second pose information according to the coordinate transformation parameter — S22

Fusing the first pose information and the second pose information subjected to the coordinate transformation to generate the fused pose information — S23

(51) Int. Cl.
  *G06V 20/56* (2022.01)
  *G06F 18/25* (2023.01)
(52) U.S. Cl.
  CPC ....... *G06V 20/56* (2022.01); *B60W 2420/403* (2013.01); *B60W 2422/70* (2013.01); *B60W 2520/28* (2013.01)
(58) Field of Classification Search
  USPC .......................................................... 701/25
  See application file for complete search history.

(56) References Cited

U.S. PATENT DOCUMENTS

| | | | |
|---|---|---|---|
| 10,989,540 B2 | 4/2021 | Song et al. | |
| 2013/0006420 A1* | 1/2013 | Karlsson | G06T 7/70 700/253 |
| 2013/0116921 A1* | 5/2013 | Kasargod | G01S 19/45 701/472 |
| 2017/0124476 A1* | 5/2017 | Levinson | G06V 20/58 |
| 2017/0124781 A1 | 5/2017 | Douillard et al. | |
| 2018/0012370 A1* | 1/2018 | Aghamohammadi | G06T 7/50 |
| 2018/0307941 A1* | 10/2018 | Holz | B66F 9/063 |
| 2019/0206123 A1 | 7/2019 | Zhou et al. | |
| 2019/0368879 A1 | 12/2019 | Roumeliotis et al. | |
| 2019/0387060 A1* | 12/2019 | Kentley-Klay | G06F 3/04842 |
| 2020/0198149 A1* | 6/2020 | Jiang | B25J 13/089 |
| 2020/0264625 A1* | 8/2020 | Estep | G06Q 10/087 |
| 2020/0388157 A1* | 12/2020 | Fukushige | G08G 1/167 |
| 2021/0117663 A1* | 4/2021 | Mori | G06F 3/014 |
| 2021/0302991 A1* | 9/2021 | Kumar | G05D 1/0248 |
| 2021/0370970 A1* | 12/2021 | Ding | G05D 1/0246 |

FOREIGN PATENT DOCUMENTS

| | | |
|---|---|---|
| CN | 108958266 A | 12/2018 |
| CN | 110155080 A | 8/2019 |
| CN | 110967011 A | 4/2020 |
| JP | 2009236532 A | 10/2009 |
| JP | 2018538647 A | 12/2018 |
| KR | 20150122097 A | 10/2015 |
| KR | 20170070455 A | 6/2017 |

OTHER PUBLICATIONS

First Office Action of Chinese priority application No. 202010497244.0, dated Sep. 14, 2021, eight pages.

"Integration of camera images and general purpose sensors to estimate vehicle position", URL: http://id.nii.ac.ip/1342/00001550/, TUMSAT-OACIS Repository—Tokyo University of Marine Science and Technology, 2017.

Request for the Submission of an Opinion in corresponding Korean Patent Application No. 10-2021-0041414, dated Jan. 11, 2023.

Notice of Reasons for Refusal in corresponding Japanese Patent Application No. 2021-064297 dated Oct. 27, 2022.

Extended European Search Report for corrresponding European patent application No. 21164864.7 dated Sep. 23, 2021, nine pages.

Liu, Jinxu et al. .: "Visual-Inertial 1-3,7-15 Odometry Tightly Coupled with Wheel; Encoder Adopting Robust Initialization and Online Extrinsic Calibration",; 2019 IEEE/RSJ International Conference on Intelligent Robots and Systems (IROS),; IEEE, Nov. 3, 2019, pp. 5391-5397, XP033695187, DOI:10.1109/1ROS40897.2019.8967607.

Peng, Gang et al.: "Robust tightly-coupled pose estimation based on monocular vision, inertia and wheel speed", ARXIV.org, Cornell University Library, 201; Olin Library Cornell University Ithaca, NY 14853, Mar. 3, 2020, 12 pages, XP081613584.

Usenko, Vladyslav et al.: "Direct visual-inertial odometry with; stereo cameras", 2016 IEEE International Conference on Robotics and Automation (ICRA), IEEE, May 16, 2016, pp. 1885-1892, XP032908405, DOI: 10.1109/ICRA.

Decision on Registration dated May 26, 2023, in corresponding Korean Application No. 10-2021-0041414 (with English translation).

* cited by examiner

CONTROL OF AUTONOMOUS VEHICLE BASED ON FUSION OF POSE INFORMATION AND VISUAL DATA

CROSS-REFERENCE TO RELATED APPLICATION

This application claims priority to Chinese Patent Application No. 202010497244.0, filed on Jun. 2, 2020, which is hereby incorporated by reference in its entirety.

TECHNICAL FIELD

Embodiments of the present application relate to the field of computer technologies, especially to the field of autonomous driving technology, in particular to a positioning method and apparatus, an autonomous driving vehicle, an electronic device and a storage medium.

BACKGROUND

With the development of the autonomous driving technology, how to realize accurate positioning of vehicles to ensure the safety of vehicles and pedestrians has become an urgent problem to be solved.

In the prior art, positioning methods for autonomous driving vehicles are mainly based on a visual odometer, while the existing visual odometers mainly accomplish positioning by monocular cameras or binocular cameras, such as estimating position and posture by accumulating motion between frames.

However, in the implementation of the proposal, the inventor found at least the following problem: the accuracy of the estimated position and posture is low since the camera is prone to vibrate during motion.

SUMMARY

A positioning method and device for accurately positioning, an autonomous driving vehicle, an electronic device and a storage medium are provided.

According to a first aspect, a positioning method is provided, which is applied to an autonomous driving vehicle, and the method includes:

collecting first pose information measured by an inertial measurement unit within a preset time period, and collecting second pose information measured by a wheel tachometer within the time period, where the time period is a sampling time interval when a camera collects adjacent frame images;

generating positioning information according to the first pose information, the second pose information and the adjacent frame images; and controlling driving of the autonomous driving vehicle according to the positioning information.

In the embodiment of the present application, the positioning information is estimated by combining the first pose information and the second pose information corresponding to the inertial measurement unit and the wheel tachometer respectively. Compared with the camera, the inertial measurement unit and the wheel tachometer are not prone to be interfered by the external environment. Therefore, the interference of the positioning information by the external environment can be avoided, thereby improving the accuracy and reliability of the positioning information, so that the autonomous driving vehicle can drive safely and reliably.

According to a second aspect, a positioning apparatus is provided, including:

a collecting module, configured to: collect first pose information measured by an inertial measurement unit within a preset time period, and collect second pose information measured by a wheel tachometer within the time period, where the time period is a sampling time interval when a camera collects adjacent frame images;

a generating module, configured to generate positioning information according to the first pose information, the second pose information and the adjacent frame images; and a controlling module, configured to control driving of the autonomous driving vehicle according to the positioning information.

According to a third aspect, an electronic device is provided, including:

at least one processor; and a memory connected with the at least one processor in communication, where, the memory stores instructions executable by the at least one processor, where the instructions are executed by the at least one processor to cause the at least one processor to perform the method according to any one embodiment as mentioned above.

According to a fourth aspect, an autonomous driving vehicle is provided, and the vehicle includes a positioning apparatus described in the above embodiment, or an electronic device described in the above embodiment.

According to a fifth aspect, a non-transitory computer-readable storage medium storing computer instructions is provided, where the computer instructions are configured to cause a computer to perform the method according to any one embodiment as mentioned above.

According to a sixth aspect, a positioning method is provided, the method including:

collecting respective pose information measured by at least two sensors within a preset time, where the time period is a sampling time interval when a camera collects adjacent frame images;

generating positioning information according to the respective pose information and the adjacent frame images.

According to technical solutions of embodiments of the present application, the disadvantages of the positioning information prone to be interfered by the external environment when the positioning is carried out via the camera in the related technology is solved, and the accurate positioning is realized, thus realizing the technical effect of safe and reliable driving of the autonomous driving vehicle.

It should be understood that the content described in this portion is not intended to identify key or important features of embodiments of the present disclosure, nor to limit the scope of the present disclosure. Other features of the present disclosure will be easily understood by the following description.

BRIEF DESCRIPTION OF DRAWINGS

Drawings are used for better understanding of the present solution and do not limit the present application, in which.

DESCRIPTION OF EMBODIMENTS

The following illustrates exemplary examples of embodiments of the present application in combination with the drawings, in which various details of the embodiments of the present application is included to facilitate understanding thereof, and they shall be regarded as merely exemplary. Therefore, those skilled in the art should realize that various changes and modifications can be made to the embodiments described herein without departing from the scope and spirit of the embodiments of the present application. Similarly, for the sake of clarity and conciseness, the description of well-known functions and structures is omitted in the following.

Figure 1:
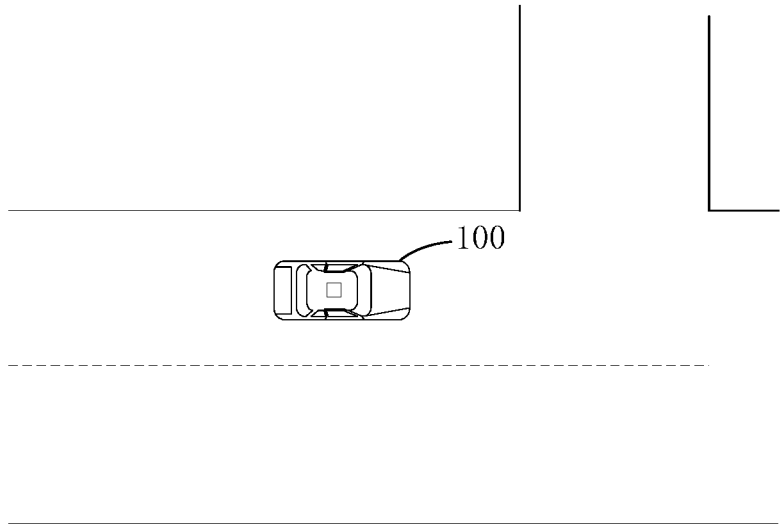
FIG. 1 is a schematic diagram of an application scene of an embodiment of the present application.

Referring to FIG. 1, FIG. 1 is an application scene diagram of a positioning method of an embodiment of the present application.

In the application scene shown in FIG. 1, an autonomous driving vehicle 100 runs on a straight road, and the autonomous driving vehicle 100 includes a processor (not shown in FIG. 1), which can execute the positioning method of embodiments of the present application to determine corresponding positioning information of the autonomous driving vehicle 100, and to control the autonomous driving vehicle 100 to adjust driving strategy according to the positioning information.

The driving strategy is used to represent a driving state of the autonomous driving vehicle, and the driving strategy includes deceleration, parking, acceleration, turning and the like.

For example, when the autonomous driving vehicle encounters a red light, the processor can control the autonomous driving vehicle to adjust a straight driving strategy to a deceleration driving strategy, or to adjust the straight driving strategy to a parking driving strategy; when a vehicle in front of the autonomous driving vehicle accelerates and the autonomous driving vehicle is far away from the vehicle in front, the processor can control the autonomous driving vehicle to adjust the straight driving strategy to an acceleration driving strategy, and the like.

In the application scene shown in FIG. 1, when the positioning information for the autonomous driving vehicle 100 is determined by the processor, it will know that the autonomous driving vehicle is close to an intersection where a left turning can be performed. If a route for the autonomous driving vehicle 100 corresponds to a left turning road, that is, the autonomous driving vehicle 100 needs to make a left turn to realize effective driving, the processor can control the autonomous driving vehicle 100 to adjust the straight driving strategy to a left turning driving strategy according to the positioning information.

Figure 2:
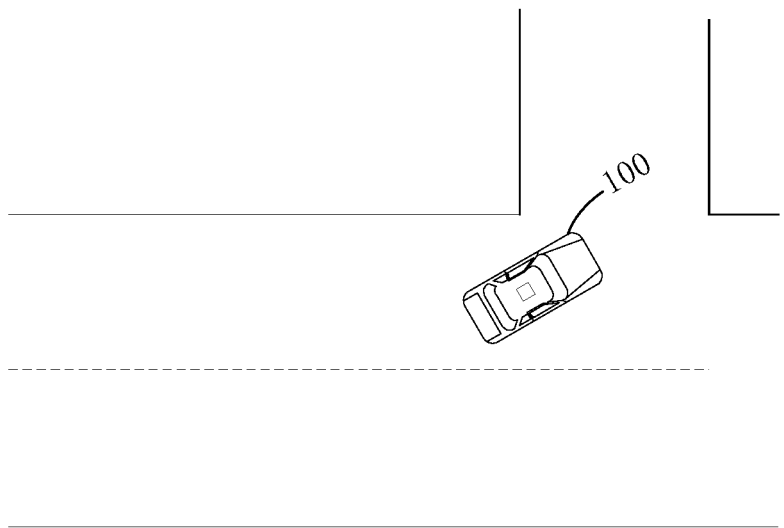
FIG. 2 is a schematic diagram of an application scene of another embodiment of the present application.

As for the case in that the processor controls the autonomous driving vehicle 100 to adjust the straight driving strategy to the left turning driving strategy, please refer to the scene diagram shown in FIG. 2 for details.

In related technologies, when positioning an autonomous driving vehicle, a monocular camera or a binocular camera is mainly used to accomplish the positioning, such as estimating a position and posture by accumulating motions between frames.

However, since the camera is prone to vibrate during motion, and the acquisition of an image by the camera is prone to be affected by the surrounding environment; as a result, by means of solutions of the related technologies, it is easy to cause low accuracy of an estimated position and posture, that is, it is easy to cause the problem of inaccurate positioning information.

In order to solve the above technical problems, the inventor of the present application, after paying creative work, obtains the invention concept of the present application: eliminating the dependence of a camera on the environment as much as possible when obtaining a picture, and correcting the positioning information effected by vibration, so as to obtain positioning information with higher accuracy.

The following illustrates in detail technical solutions of the present application and how the technical solutions of the present application solve the above-mentioned technical problems with respect to specific embodiments. The following specific embodiments can be combined with each other, and the same or similar concepts or processes may not be repeated in some embodiments. Embodiments of the present application will be described in combination with the drawings in the following.

Figure 3:
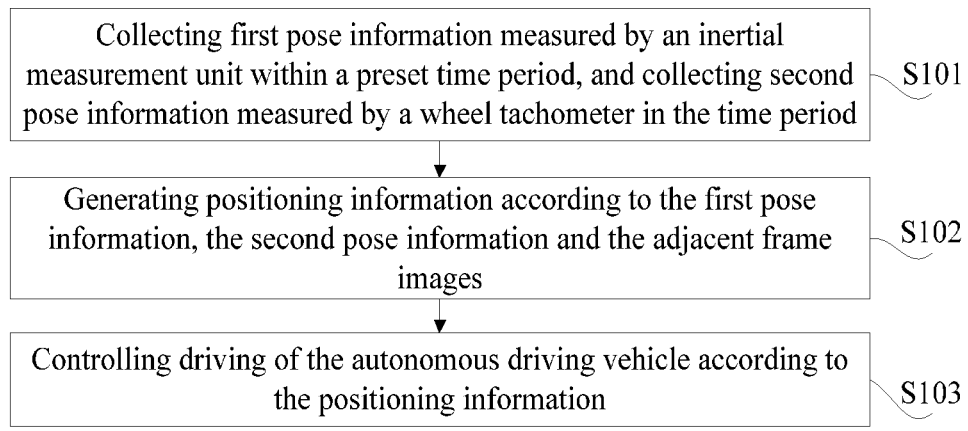
FIG. 3 is a flowchart diagram of a positioning method of an embodiment of the present application.

Referring to FIG. 3, FIG. 3 is a flowchart diagram of a positioning method of an embodiment of the present application.

As shown in FIG. 3, the method includes:

S101: collecting first pose information measured by an inertial measurement unit within a preset time period, and collecting second pose information measured by a wheel tachometer within the time period, where the time period is a sampling time interval when a camera collects adjacent frame images.

The executive body of embodiments of the present application may be a positioning apparatus, and the positioning apparatus can be a computer, a server, a processor, an on-board terminal, a remote information processor (on-board T-BOX) and a chip (such as an embedded chip), etc., which is provided on an autonomous driving vehicle.

For example, if the positioning method of an embodiment of the present application is applied to the application scene shown in FIG. 1, the executive body of the positioning method in the embodiment of the present application may be a processor.

The time period is related to the adjacent frame images collected by the camera, which in particular can be the time period determined according to the corresponding time interval of the adjacent frame images. That is to say, if the time of a first frame image captured by the camera is T0, the time of a second frame image is T1, and the first frame image and the second frame image are two adjacent frame images, and thus the time period=T1−T0. The pose information includes position information and posture information.

In this step, the pose information (i.e. the first pose information) measured by the inertial measurement unit and the pose information (the second pose information) measured by the wheel tachometer within the time period are collected respectively.

The inertial measurement unit (IMU) is a device for measuring a posture angle (or angular velocity), acceleration and the like of an object. Generally, one IMU includes three single axis accelerometers and three single axis gyroscopes, where the accelerometer detects acceleration signal of an object on independent three-axis in a carrier coordinate system, and the gyroscope detects angular velocity signal of a carrier relative to a navigation coordinate system, so as to measure the angular velocity and the acceleration of the object in the three-dimensional space.

In other words, the first pose information is configured to represent the corresponding position information and/or posture information of the autonomous driving vehicle collected by the inertial measurement unit, where the posture information includes a posture angle, an angular rate, acceleration and other information. That is, in embodiments of the present application, the inertial measurement unit can determine the posture angle, the angular rate, the acceleration and other information of the autonomous driving vehicle, and the relevant information measured by the inertial measurement unit can be determined as the first pose information.

The wheel tachometer is also referred to as a wheel speed sensor, and the second pose information is configured to represent the corresponding position information and/or posture information of the autonomous driving vehicle collected by the wheel tachometer, where the posture information includes speed, acceleration and other information. That is, in embodiments of the present application, the wheel tachometer is configured to collect the speed, the acceleration and other information of the autonomous driving vehicle, and the collected relevant information can be determined as the second pose information.

It is worth noting that the terms "first" and "second" of the first pose information and the second pose information are used to distinguish the relevant information collected by the inertial measurement unit and the wheel tachometer.

S102: generating the positioning information according to the first pose information, the second pose information and the adjacent frame images.

In this step, it can be understood that the positioning information is estimated according to the first pose information, the second pose information and the adjacent images.

In the embodiment of the present application, the positioning information is estimated by combining the first pose information and the second pose information corresponding to the inertial measurement unit and the wheel tachometer respectively. Compared with the camera, the inertial measurement unit and the wheel tachometer are not prone to be interfered by the external environment. Therefore, the interference of the positioning information by the external environment can be avoided, thereby improving the accuracy and reliability of the positioning information.

S103: controlling driving of the autonomous driving vehicle according to the positioning information.

In this step, after the positioning information is determined, the driving of the autonomous driving vehicle can be controlled, for example, to adjust the driving strategy of the autonomous driving vehicle. As shown in FIG. 1, the driving strategy of the autonomous driving vehicle is adjusted from the straight driving strategy to the left turning driving strategy according to the positioning information, so that the autonomous driving vehicle can drive safely and reliably.

On the basis of the above analysis, the embodiment of the present application provides a positioning method, which can be applied to the autonomous driving vehicle. The method includes: collecting first pose information measured by an inertial measurement unit within a preset time period, and collecting second pose information measured by a wheel tachometer within the time period, where the time period is a sampling time interval when a camera collects adjacent frame images; generating positioning information according to the first pose information, the second pose information and the adjacent frame images; controlling driving of the autonomous driving vehicle according to the positioning information. The positioning information is estimated by combining the first pose information and the second pose information corresponding to the inertial measurement unit and the wheel tachometer respectively. Compared with the camera, the inertial measurement unit and the wheel tachometer are not prone to be interfered by the external environment. Therefore, the interference of the positioning information by the external environment can be avoided, thereby improving the accuracy and reliability of the positioning information, so that the autonomous driving vehicle can drive safely and reliably.

Figure 4:
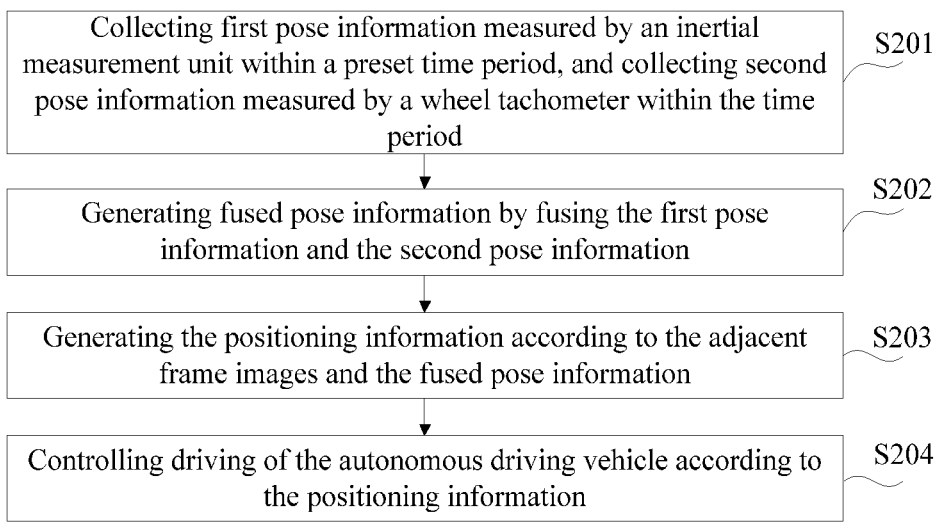
FIG. 4 is a flowchart diagram of a positioning method of another embodiment of the present application.

In order to facilitate better understanding of the specific process of generating the positioning information, the positioning method according to an embodiment of the present application is described in detail in combination with FIG. 4. FIG. 4 is a flowchart diagram for a positioning method of another embodiment of the present application.

As shown in FIG. 4, the method includes:

S201: collecting first pose information measured by an inertial measurement unit within a preset time period, and collecting second pose information measured by a wheel tachometer within the time period, where the time period is a sampling time interval when a camera collects adjacent frame images.

Regarding the description of S201, please refer to S101, and it will not be repeated here.

S202: fusing the first position and position and the second posture information to generate fused pose information.

In order to ensure the reliability of the pose information used to determine the positioning information, in this step, the first pose information and the second pose information are fused.

In other words, the step may be a process of rectifying the two pose information mutually, so as to improve the reliability and accuracy of the pose information used to generate the positioning information as much as possible.

Figure 5:
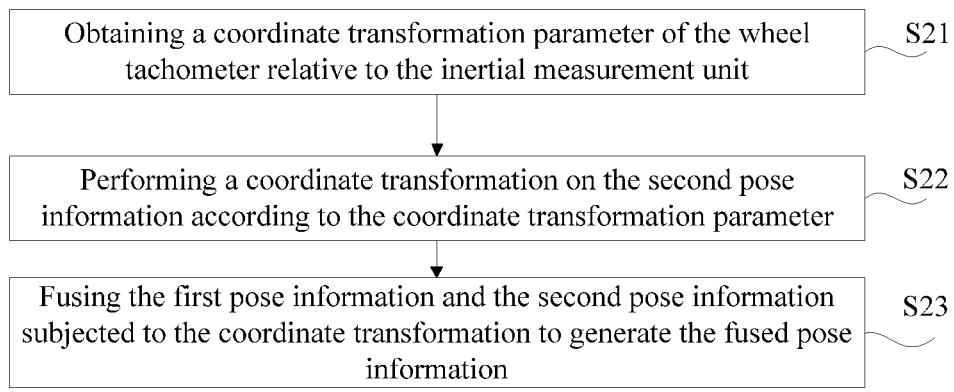
FIG. 5 is a flowchart diagram of a method for generating fused pose information of the present application.

It will be known in combination with FIG. 5 that, in some embodiments, S202 may specifically include:

S21: obtaining a coordinate transformation parameter of the wheel tachometer relative to the inertial measurement unit.

Specifically, rotation, displacement and other parameters of the wheel tachometer relative to the inertial measurement unit can be calibrated. That is, taking the coordinate system of the inertial measurement unit as the reference and the inertial measurement unit as the origin coordinate, the rotation, the displacement and other parameters of the wheel tachometer relative to the inertial measurement unit are obtained to determine the coordinate transformation parameter.

S22: performing a coordinate transformation on the second pose information according to the coordinate transformation parameter.

This step can be understood as transforming the second pose information from a wheel tachometer coordinate system to an inertial measurement unit coordinate system.

Specifically, a calculation method of the transformation can refer to the coordinate transformation formula in the prior art, which will not be repeated here.

S23: fusing the first pose information and the second pose information subjected to the coordinate transformation to generate the fused pose information.

It is worth noting that after S22, the second pose information (i.e. the second pose information subjected to the coordinate transformation) taking the inertial measurement unit coordinate system as the reference can be obtained. On the basis of this, the two pose information can be fused quickly and easily.

On the basis of the above analysis, in the embodiment of the present application, after the coordinate transformation parameter is determined, the second pose information is transformed in coordinate based on the coordinate transformation parameter, so as to generate the fused pose information according to the first pose information and the second pose information subjected to the coordinate transformation. The fusion process is based on the same coordinate system, thereby accelerating the fusion process, ensuring the reliability and accuracy of the fusion process, and thus ensuring the technical effect of the accuracy and reliability of the fused pose information.

S203: generating the positioning information according to the adjacent frame images and the fused pose information.

The accuracy of the fused pose information is relatively high, and it is not prone to be interfered by the external environment. Therefore, in the embodiment of the present application, by generating the positioning information according to the fused pose information and the adjacent frame images, the problem of interference from the external environment when the positioning information is generated from the adjacent frame images can be avoided, so as to improve the accuracy and reliability of the positioning information.

Figure 6:
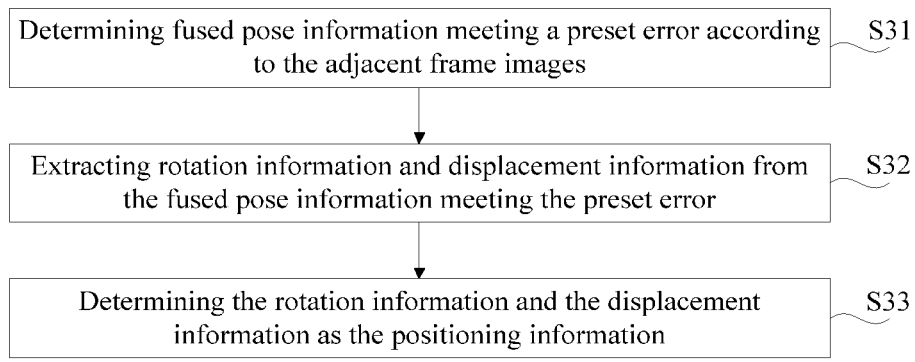
FIG. 6 is a flowchart diagram of a method for generating the positioning information according to adjacent frame images and the fused pose information of the present application.

It will be known in combination with FIG. 6 that, in some embodiments, S203 may specifically include:

S31: determining fused pose information meeting a preset error according to the adjacent frame images.

The adjacent frame images include image coordinate information of a preset feature point, then S31 can specifically include: inputting the image coordinate information and the fused pose information into a preset error model, and obtaining a result outputted from the error model as the fused pose information meeting the preset error.

The error model includes internal parameters of the camera and external parameters of the camera, and the external parameters of the camera include a rotation parameter and a displacement parameter of the camera relative to the inertial measurement unit.

The error model is as follows:

$$r_p = \frac{\rho_j}{\rho_i} R_{BC_k} R_{WB_j} R_{WB_i} R_{BC_k} P_i +$$

$$\rho_i \left( t_{BC_k} + R_{BC_k} t_{WB_j} + R_{BC_k} R_{WB_j} t_{WB_i} + R_{BC_k} R_{WB_j} R_{WB_i} t_{BC_k} \right) - P_j$$

where $r_p$ is the error, $\rho_j$ is the inverse depth of the j-th frame image, $\rho_i$ is the inverse depth of the i-th frame image, $R_{BC_k}$ is the external parameter (specifically the rotation parameter) of the camera, $R_{WB_j}$ is the rotation of the j-th frame image, $R_{WB_i}$ is the rotation of the i-th frame image, $P_i$ is the image coordinate information of the feature point in the i-th frame image, $t_{BC_k}$ is the external parameter (specifically the displacement parameter) of the camera, $t_{WB_j}$ is the displacement of the j-th image, and $P_j$ is the image coordinate information of the feature point in the j-th frame image.

In combination with the above example, the T0 frame image is the i-th frame image, and the T1 frame image is the j-th frame image.

S32: extracting rotation information and displacement information from the fused pose information meeting the preset error.

That is, the rotation information is $R_{WB_j}$ meeting the above formula, and the displacement information is $t_{WB_j}$ meeting the above formula.

In the embodiment of the present application, the rotation information and the displacement information meeting the error are determined by combining the relevant information of the adjacent frame images and the relevant information of the camera, so as to reduce the error about the rotation information and the displacement information as much as possible, thereby improving the accuracy and reliability of the positioning information.

S33: determining the rotation information and the displacement information as the positioning information.

S204: controlling the driving of the autonomous driving vehicle according to the positioning information.

Regarding the description of S204, please refer to S103, and it will not be repeated here.

Figure 7:
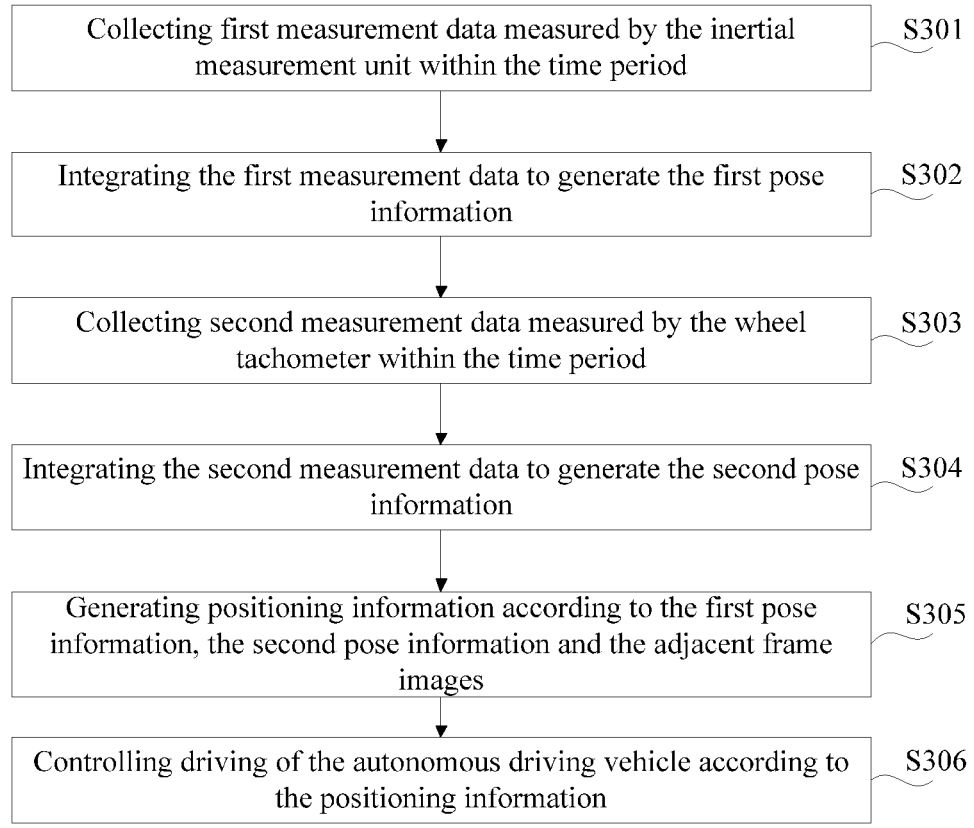
FIG. 7 is a flowchart diagram of a positioning method of yet another embodiment of the present application.

In order to let readers understand the specific process of obtaining the first pose information and the second pose information more clearly, a positioning method according to an embodiment of the present application is described in detail in combination with FIG. 7, where FIG. 7 is a flowchart diagram for a positioning method according to yet another embodiment of the present application.

As shown in FIG. 7, the method includes:

S301: collecting first measurement data measured by the inertial measurement unit within the time period.

S302: integrating the first measurement data to generate the first pose information.

Based on the above examples, it can be seen that the inertial measurement unit can measure the posture angle, the angular velocity, the angular velocity, the rotation, the speed, the displacement and other information of the autonomous driving vehicle, and therefore the first measurement data is the corresponding posture angle, the angular velocity, the angular velocity, the rotation, the speed, the displacement and other data of the autonomous driving vehicle collected by the inertial measurement unit.

In an embodiment of the present application, after first measurement data is obtained, the first measurement data is integrated to generate the first pose information.

Generally speaking, the first measurement data is discrete data, therefore, when the first measurement data is processed by integration, part of the information can be filtered out, while the rotation, the velocity and the displacement will be retained.

Therefore, part of the first measurement data can be filtered by integrating the first measurement data, so as to avoid the redundancy of subsequent calculation, thereby improving the calculation efficiency. Moreover, since redundant information is filtered out, the accuracy and reliability of the first pose information can be ensured, thereby realizing the reliability and accuracy of the positioning information.

Specifically, the first pose information subjected to the integration includes the rotation, the velocity and the displacement, which can be denoted by the following formulas:

$R_{WB}$ (T1)=$R_{WB}$(T0)Exp($\omega_{BW}\Delta t$), where $R_{WB}$ (T1) is the rotation corresponding to T1, $R_{WB}$(T0) is the rotation corresponding to T0, and $\omega_{BW}\Delta t$ is the angular velocity corresponding to (T1-T0);

$V_{WB}(T1)=V_{WB}(T0)+\alpha_{WB}\Delta t$, where $V_{WB}(T1)$ is the velocity corresponding to T1, $V_{WB}(T0)$ is the velocity corresponding to T0, and $\alpha_{WB}\Delta t$ is the acceleration corresponding to (T1–T0);

$t_{WB}(T1)=t(T0)+V_{WB}\Delta t+\alpha_{WB}\Delta t^2$, where $t_{WB}$ (T1) is the displacement corresponding to T1, $t(T0)$ is the displacement corresponding to T0, $V_{WB}\Delta t$ is the velocity corresponding to (T1–T0), and $\alpha_{WB}\Delta t^2$ is a square of the acceleration corresponding to (T1-T0).

Based on the above example, if the adjacent frame images are distributed as the j-th frame image and the i-th frame image, the rotation, the speed and the displacement corresponding to the j-th frame image can be obtained by introducing into the above formula. Specifically, the rotation formula is as follows:

$$R_{WB}(t_j) = R_{WB}(t_i) \prod_{k=i}^{j-1} \text{Exp}((\varpi_{BW}(t_k) - b_g(t_k) - \eta_g(t_k))\Delta t)$$

The velocity formula is as follows:

$$V_{WB}(t_j) = V_{WB}(t_i) + g_W(t_j - t_i) + \sum_{k=i}^{j-1} R_{WB}(t_k)(a_{WB}(t_k) - b_a(t_k) - \eta_a(t_k))\Delta t$$

The displacement formula is as follows:

$$t_{WB}(t_j) = t_{WB}(t_i) + \sum_{k=i}^{j-1} V(t_k)(t_j - t_i) + \frac{1}{2}g_W(t_j - t_i)^2 + \frac{1}{2}\sum_{k=i}^{j-1} R_{WB}(t_k)(a_{WB}(t_k) - b_a(t_k) - \eta_a(t_k))\Delta t^2$$

where $t_j$ is the time corresponding to the j-th frame image, $t_i$ is the time corresponding to the i-th frame image, $b_g$ and $b_a$ are a zero offset corresponding to the inertial measurement unit, $\eta_g$ and $\eta_a$ are a white noise corresponding to the inertial measurement unit, $\Delta t$ is a time difference between the time corresponding to the i-th frame image and the time corresponding to the j-th frame image, and $g_W$ is a preset gravity acceleration, e.g., 9.8 m/s$^2$.

S303: collecting second measurement data measured by the wheel tachometer within the time period.

S304: integrating the second measurement data to generate the second pose information.

Similarly, in an embodiment of the present application, after the second measurement data is obtained, the second measurement data is integrated to generate the second pose information.

Generally speaking, the second measurement data is discrete data, therefore, when the second measurement data is processed by integration, part of the information can be filtered out, while the velocity and the displacement will be retained.

Therefore, part of the second measurement data can be filtered by integrating the second measurement data, so as to avoid the redundancy of subsequent calculation, thereby improving the calculation efficiency. Moreover, since redundant information is filtered out, the accuracy and reliability of the second pose information can be ensured, thereby realizing the reliability and accuracy of the positioning information.

The relationship between the wheel tachometer and the inertial measurement unit can be denoted as follows:

$V_{WB}(T1)=R_{WB}(T0) R_{BS} V_S–0\times R_{WB}t_{BS}+\omega\times t_{BS}$ where $R_{WB}$ is the rotation parameter of the wheel tachometer coordinate system relative to the inertial measurement unit coordinate system, $V_S$ is the speed measured by the wheel tachometer, and $t_{BS}$ is the displacement parameter of the wheel tachometer coordinate system relative to the inertial measurement unit coordinate system.

The second pose information subjected to integration includes the velocity and the displacement, which can be denoted by the following formula:

$t_{WB}(T1)=\int_{T0}^{T1} V_{WB}d\tau$, where $t_{WB}(T1)$ is the displacement corresponding to T1, and $V_{WB}$ is the velocity.

S305: generating the positioning information according to the first pose information, the second pose information and the adjacent frame images.

Regarding the description of S305, please refer to S102, or refer to S202 to S203, which will not be repeated here.

S306: controlling the driving of the autonomous driving vehicle according to positioning information.

S307: regarding the description of S307, please refer to S103, which will not be repeated here.

According to another aspect of embodiments of the present application, the embodiment of the present application further provides a positioning apparatus corresponding to the above method embodiments, so as to realize the positioning method described in any of the above embodiments.

Figure 8:
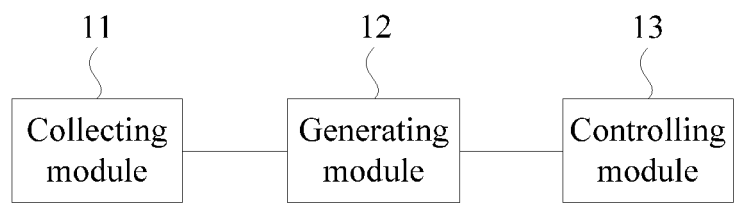
FIG. 8 is a schematic diagram of the positioning apparatus according to an embodiment of the present application.

Referring to FIG. 8, FIG. 8 is a schematic diagram of a positioning apparatus according to an embodiment of the present application.

As shown in FIG. 8, the apparatus includes:

a collecting module 11, configured to collect first pose information measured by an inertial measurement unit within a preset time period, and collect second pose information measured by a wheel tachometer within the time period, where the time period is a sampling time interval when a camera collects adjacent frame images;

a generating module 12, configured to generate positioning information according to the first pose information, the second pose information and the adjacent frame images;

a controlling module 13, configured to control driving of an autonomous driving vehicle according to the positioning information.

In some embodiments, the generating module 12 is configured to generate fused pose information by fusing the first pose information and the second pose information, and to generate the positioning information according to the adjacent frame images and the fused pose information.

In some embodiments, the generating module 12 is configured to obtain a coordinate transformation parameter of the wheel tachometer relative to the inertial measurement unit, to perform a coordinate transformation on the second pose information according to the coordinate transformation parameter, and to fuse the first pose information and the second pose information subjected to the coordinate transformation to generate the fused pose information.

In some embodiments, the generating module 12 is configured to determine fused pose information meeting a preset error according to the adjacent frame images, to extract rotation information and displacement information from the fused pose information meeting the preset error, and to determine the rotation information and the displacement information as the positioning information.

In some embodiments, the adjacent frame images include image coordinate information of a preset feature point; and the generating module 12 is configured to input the image coordinate information and the fused pose information into a preset error model, and obtain a result outputted from the error mode as the fused pose information meeting the preset error.

In some embodiments, the error model includes an internal parameter of the camera and an external parameter of the camera, and the external parameter of the camera includes a rotation parameter and a displacement parameter of the camera relative to the inertial measurement unit.

In some embodiments, the collecting module 11 is configured to collect first measurement data measured by the inertial measurement unit within the time period, and to integrate the first measurement data to generate the first pose information.

In some embodiments, the collecting module 11 is configured to collect second measurement data measured by the wheel tachometer within the time period, and to integrate the second measurement data to generate the second pose information.

According to embodiments of the present application, the present application further provides an electronic device and a readable storage medium.

Figure 9:
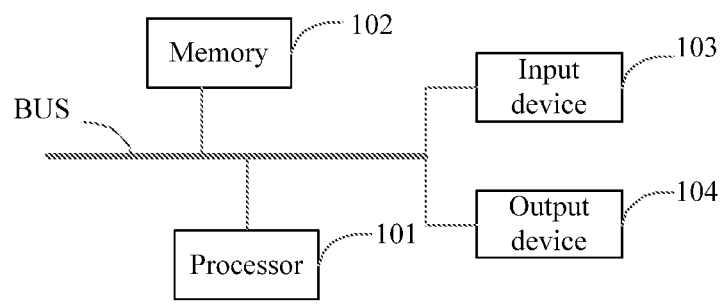
FIG. 9 is a block diagram of an electronic device according to an embodiment of the present application.

Referring to FIG. 9, FIG. 9 is a block diagram of an electronic device according to an embodiment of the present application.

The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile devices, such as a personal digital assistant, a cellular phone, a smart phone, a wearable device, and other similar computing devices. Components shown herein, connections and relationships thereof, as well as functions thereof are merely examples and are not intended to limit the present application implementation described and/or claimed herein.

As shown in FIG. 9, the electronic device includes: one or more processors 101, memory 102, and interfaces for connecting various components, including a high-speed interface and a low-speed interface. The various components are interconnected through different buses and can be installed on a common motherboard or be installed in other ways as required. The processor may process instructions executed within the electronic device, where the instructions include instructions stored in or on a memory to display graphical information of the GUI on an external input/output device (such as, a display device coupled to an interface). In other embodiments, a plurality of processors and/or a plurality of buses may be used with a plurality of memories, if required. Similarly, a plurality of electronic devices can be connected, each of which provides some of the necessary operations (for example, functions as a server array, a set of blade servers, or a multiprocessor system). In FIG. 9, one processor 101 is taken as an example.

The memory 102 is a non-transitory computer-readable storage medium provided in the present application. The memory stores instructions executable by at least one processor to cause the at least one processor to perform the positioning method provided by the embodiment of the present application. The non-transitory computer-readable storage medium of the present application stores computer instructions, where the computer instructions are configured to cause a computer to perform the positioning method provided by the embodiment of the present application.

The memory 102, as a non-transitory computer-readable storage medium, can be configured to store a non-transitory software program, a non-transitory computer executable program and module, such as a program instruction/module in the embodiments of the present application. By running the non-transitory software program, instructions and modules stored in the memory 102, the processor 601 performs various functional applications and data processing of the server, that is, realizes the positioning method in the above method embodiments.

The memory 102 may include a program storing area and a data storing area, where the program storing area may store an operating system and application programs required by at least one function; and the data storing area may store data created according to the use of the electronic device and the like. In addition, the memory 102 may include a high-speed random access memory, and may also include a non-transitory memory, such as at least one disk storage device, a flash memory device, or other non-transitory solid-state memory devices. In some embodiments, the memory 102 may optionally include memories provided remotely with respect to the processor 101, and these remote memories may be connected via a network to an electronic device. Examples of the above-mentioned network may include, but are not limited to, Internet, an intranet, a local area network, a block-chain-based service network (BSN), a mobile communication network and a combination thereof.

The electronic device may further include: an input device 103 and an output device 104. The processor 101, the memory 102, the input device 103 and the output device 104 may be connected via a bus or other means, and an example of a connection via the bus is shown in FIG. 9.

The input device 103 may receive inputted digital or personal information, and generate key signal input related to a user setting and functional control of the electronic device. The input device, for example, is a touch screen, a keypad, a mouse, a trackpad, a touchpad, a pointer, one or more mouse buttons, a trackball, a joystick and other input devices. The output device 104 may include: a display device, an auxiliary lighting device (e.g., an LED), a tactile feedback device (e.g., a vibration motor) and the like. The display device may include, but is not limited to, a liquid crystal display (LCD), a light emitting diode (LED) display and a plasma display. In some embodiments, the display device may be a touch screen.

Various embodiments of the systems and technologies described herein may be implemented in a digital electronic circuit system, an integrated circuit system, a specialized ASIC (application specific integrated circuits), computer hardware, firmware, software, and/or a combination thereof. These various embodiments may include: being implemented in one or more computer programs, where the one or more computer programs may be executed and/or interpreted on a programmable system including at least one programmable processor, where the programmable processor may be a specialized or general-purpose programmable processor, which may receive data and instructions from a storage system, at least one input device and at least one output device and send the data and instructions to the storage system, the at least one input device and the at least one output device.

These computer programs (also referred to as programs, software, software applications, or code) include machine instructions for programmable processors and can be implemented by using a high-level procedure and/or object-oriented programming language, and/or an assembly/machine language. As used herein, the terms "machine-readable medium" and "computer-readable medium" refer to any computer program product, apparatus, and/or device (e.g., a magnetic disk, an optical disk, a memory, a programmable logic device (PLD)) for providing machine instructions and/or data to the programmable processor, and include a machine-readable medium that receives machine instructions as machine-readable signals. The term "machine-readable signal" refers to any signal configured to provide machine instructions and/or data to the programmable processor.

In order to provide interaction with an user, the systems and techniques described herein may be implemented on a computer, where the computer has: a display device (e.g., a CRT (cathode ray tube) or a LCD (liquid crystal display) monitor) for displaying information to the user; and a keyboard and a pointing device (e.g., a mouse or a trackball), through which the user can provide input to a computer. Other types of devices may also be used to provide interaction with the user; for example, the feedback provided to the user may be any form of sensing feedback (such as, visual feedback, auditory feedback, or tactile feedback); and the input from the user may be received in any form (including acoustic input, voice input, or tactile input).

The systems and technologies described here may be implemented in a computing system (e.g., a data server) including a back-end component, or in a computing system (e.g., an application server) including a middleware component, or in a computing system (e.g., a user computer having a graphical user interface or a web browser, through which the user can interact with the implementation of the systems and technologies described herein) including a front-end component, or in a computing system including any combination of the background component, the middleware component, or the front-end component. The components of the system may be interconnected via digital data communication (e.g., a communication network) in any form or medium. Examples of the communication network include: a local area network (LAN), a block-chain-based service network (BSN), a wide area network (WAN) and Internet.

The computer system may include a client and a server. The client and the server are generally located far away from each other and usually interact with each other through a communication network. A relationship between the client and the server is generated by computer programs running on corresponding computers and having a client-server relationship between each other.

According to another aspect of embodiments of the present application, the embodiments of the present application further provides an autonomous driving vehicle, where the autonomous driving vehicle includes the positioning apparatus described in the above embodiments, or includes the electronic device described in the above embodiments.

According to another aspect of embodiments of the present application, the embodiments of the present application further provide a positioning method.

Figure 10:
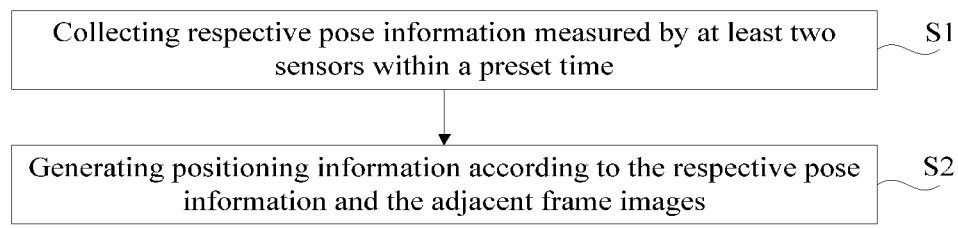
FIG. 10 is a flowchart diagram of a positioning method of yet another embodiment of the present application.

Referring to FIG. 10, FIG. 10 is a flowchart diagram of a positioning method of yet another embodiment of the present application.

As shown in FIG. 10, the method includes:

S1: collecting respective pose information measured by at least two sensors within a preset time period, where the time period is a sampling time interval when a camera collects adjacent frame images.

The number of sensors is multiple, and one sensor corresponds to one kind of pose information. In other words, each sensor collects the pose information of the autonomous driving vehicle.

The sensor can also be an inertial measurement unit, a wheel tachometer, a radar sensor and the like, which will not be listed here.

Specifically, when the number of sensors is two, one sensor can be the inertial measurement unit described in the above examples, and the respective pose information is the first pose information in the above examples; and the other sensor can be the wheel tachometer described in the above examples, and the respective pose information is the second pose information in the above examples.

S2: generating positioning information according to the respective pose information and the adjacent frame images.

In the embodiments of the present application, it is equivalent to rectifying, according to the respective pose information, the positioning information corresponding to the adjacent frame images, so as to generate the positioning information with higher reliability. For specific process, please refer to the above examples, which will not be repeated here.

It should be understood that steps can be reordered, added, or deleted using the various forms of processes shown above. For example, the steps recited in the present application can be performed in parallel, in sequence or in different orders, as long as expected results of the technical solution disclosed by the present application can be realized, and there is no limitation herein.

The above specific implementations do not limit the protection scope of the present application. It should be understood by those skilled in the art that various modifications, combinations, sub-combinations and substitutions may be made according to design requirements and other factors. Any modification, equivalent replacement and improvement made within the spirit and principle of the present application shall be included in the protection scope of the present application.

What is claimed is:

1. A positioning method, wherein the method is applied to an autonomous driving vehicle, and the method comprises:
    collecting first pose information measured by an inertial measurement unit within a preset time period, and collecting second pose information measured by a wheel tachometer within the time period, wherein the time period is a sampling time interval when a camera collects adjacent frame images;
    generating positioning information according to the first pose information, the second pose information and the adjacent frame images; and
    controlling driving of the autonomous driving vehicle according to the positioning information;
    wherein the generating the positioning information according to the first pose information, the second pose information and the adjacent frame images comprises:
        generating fused pose information by fusing the first pose information and the second pose information; and
        generating the positioning information according to the adjacent frame images and the fused pose information;
    wherein the generating the positioning information according to the adjacent frame images and the fused pose information comprises:

determining fused pose information that is in line with a preset error according to the adjacent frame images; and extracting rotation information and displacement information from the fused pose information that is in line with the preset error, and determining the rotation information and the displacement information as the positioning information;

wherein the adjacent frame images comprise image coordinate information of a preset feature point; and the determining fused pose information that is in line with a preset error according to the adjacent frame images comprises:

inputting the image coordinate information and the fused pose information into a preset error model; and obtaining a result outputted from the error model as the fused pose information that is in line with the preset error;

wherein the error model comprises an internal parameter of the camera and an external parameter of the camera, and the external parameter of the camera comprises a rotation parameter and a displacement parameter of the camera relative to the inertial measurement unit.

2. The method according to claim 1, wherein the generating the fused pose information by fusing the first pose information and the second pose information comprises:

obtaining a coordinate transformation parameter of the wheel tachometer relative to the inertial measurement unit;

performing a coordinate transformation on the second pose information according to the coordinate transformation parameter; and fusing the first pose information and the second pose information subjected to the coordinate transformation to generate the fused pose information.

3. The method according to claim 1, wherein the collecting the first pose information measured by the inertial measurement unit within the preset time period comprises:

collecting first measurement data measured by the inertial measurement unit within the time period; and integrating the first measurement data to generate the first pose information.

4. The method according to claim 1, wherein the collecting the second pose information measured by the wheel tachometer within the time period comprises:

collecting second measurement data measured by the wheel tachometer within the time period; and integrating the second measurement data to generate the second pose information.

5. A positioning apparatus, wherein the apparatus comprises:

at least one processor; and a memory connected with the at least one processor in communication, wherein, the memory stores instructions executable by the at least one processor, wherein the instructions are executed by the at least one processor to cause the at least one processor to: collect first pose information measured by an inertial measurement unit within a preset time period, and collect second pose information measured by a wheel tachometer within the time period, wherein the time period is a sampling time interval when a camera collects adjacent frame images;

generate positioning information according to the first pose information, the second pose information and the adjacent frame images; and control driving of the autonomous driving vehicle according to the positioning information;

wherein the at least one processor is further enabled to: generate fused pose information by fusing the first pose information and the second pose information; and generate the positioning information according to the adjacent frame images and the fused pose information;

wherein the at least one processor is further enabled to: determine fused pose information that is in line with a preset error according to the adjacent frame images; extract rotation information and displacement information from the fused pose information that is in line with the preset error, and determine the rotation information and the displacement information as the positioning information;

wherein the adjacent frame images comprise image coordinate information of a preset feature point; the at least one processor is further enabled to input the image coordinate information and the fused pose information into a preset error model; and obtain a result outputted from the error model as the fused pose information that is in line with the preset error;

wherein the error model comprises an internal parameter of the camera and an external parameter of the camera, and the external parameter of the camera comprises a rotation parameter and a displacement parameter of the camera relative to the inertial measurement unit.

6. The apparatus according to claim 5, wherein the at least one processor is further enabled to: obtain a coordinate transformation parameter of the wheel tachometer relative to the inertial measurement unit; perform a coordinate transformation on the second pose information according to the coordinate transformation parameter; and fuse the first pose information and the second pose information subjected to the coordinate transformation to generate the fused pose information.

7. The apparatus according to claim 5, wherein the at least one processor is further enabled to collect first measurement data measured by the inertial measurement unit within the time period; and integrate the first measurement data to generate the first pose information.

8. The apparatus according to claim 5, wherein the at least one processor is further enabled to collect second measurement data measured by the wheel tachometer within the time period, and integrate the second measurement data to generate the second pose information.

9. A non-transitory computer-readable storage medium for storing computer instructions, wherein the computer instructions are configured to cause a computer to perform the following steps:

collecting first pose information measured by an inertial measurement unit within a preset time period, and collecting second pose information measured by a wheel tachometer within the time period, wherein the time period is a sampling time interval when a camera collects adjacent frame images;

generating positioning information according to the first pose information, the second pose information and the adjacent frame images; and controlling driving of the autonomous driving vehicle according to the positioning information;

wherein the computer instructions are further configured to cause the computer to perform the following steps:

generating fused pose information by fusing the first pose information and the second pose information; and generating the positioning information according to the adjacent frame images and the fused pose information;

wherein the computer instructions are further configured to cause the computer to perform the following steps:

determining fused pose information that is in line with a preset error according to the adjacent frame images; and extracting rotation information and displacement information from the fused pose information that is in line with the preset error, and determining the rotation information and the displacement information as the positioning information;

wherein the adjacent frame images comprise image coordinate information of a preset feature point; and the computer instructions are further configured to cause the computer to perform the following steps:

inputting the image coordinate information and the fused pose information into a preset error model; and obtaining a result outputted from the error model as the fused pose information that is in line with the preset error;

wherein the error model comprises an internal parameter of the camera and an external parameter of the camera, and the external parameter of the camera comprises a rotation parameter and a displacement parameter of the camera relative to the inertial measurement unit.

10. The non-transitory computer-readable storage medium according to claim 9, wherein the computer instructions are further configured to cause the computer to perform the following steps:

obtaining a coordinate transformation parameter of the wheel tachometer relative to the inertial measurement unit;

performing a coordinate transformation on the second pose information according to the coordinate transformation parameter; and fusing the first pose information and the second pose information subjected to the coordinate transformation to generate the fused pose information.

\* \* \* \* \*